March 31, 1953     J. R. GAMMETER     2,633,194
MACHINE FOR CUTTING CONTOURED SHAPES
Filed March 26, 1951     3 Sheets-Sheet 1

INVENTOR.
JOHN R. GAMMETER
BY
William Cleland
ATTORNEY

March 31, 1953  J. R. GAMMETER  2,633,194
MACHINE FOR CUTTING CONTOURED SHAPES
Filed March 26, 1951  3 Sheets-Sheet 3

INVENTOR.
JOHN R. GAMMETER
BY
William Cleland
ATTORNEY

Patented Mar. 31, 1953

2,633,194

UNITED STATES PATENT OFFICE 2,633,194

MACHINE FOR CUTTING CONTOURED SHAPES

John R. Gammeter, Akron, Ohio

Application March 26, 1951, Serial No. 217,657

8 Claims. (Cl. 164—19)

This invention relates to apparatus for cutting or trimming thin material, and in particular relates to a device for trimming thin rubber articles, such as dipped rubber protective sheaths.

Rubber protective sheaths of the type referred to have been found difficult to trim by ordinary methods, such as by use of a rotatable cutting roll in cooperation with a pressure roll, because of the difficulty of properly manually positioning the article between the rolls. Where it was desired to trim a reduced neck of the article to have diametrically opposite tabs thereon it was practically impossible to provide a neat, uniform edge. Moreover, the use of such devices for trimming small articles incurred a danger of injuring the operator's fingers.

One object of the invention is to provide a simple trimming or pinking device of the character described which permits an operator safely to retain firm finger grip on relatively small articles during the trimming operation on the same.

Another object of the invention is to provide a trimming or pinking device of the character described which provides a view of a cutting die thereof to facilitate accurate positioning of the object to be trimmed on the die.

Other objects of the invention will be manifest from the following brief description and the accompanying drawings.

Figure 1:
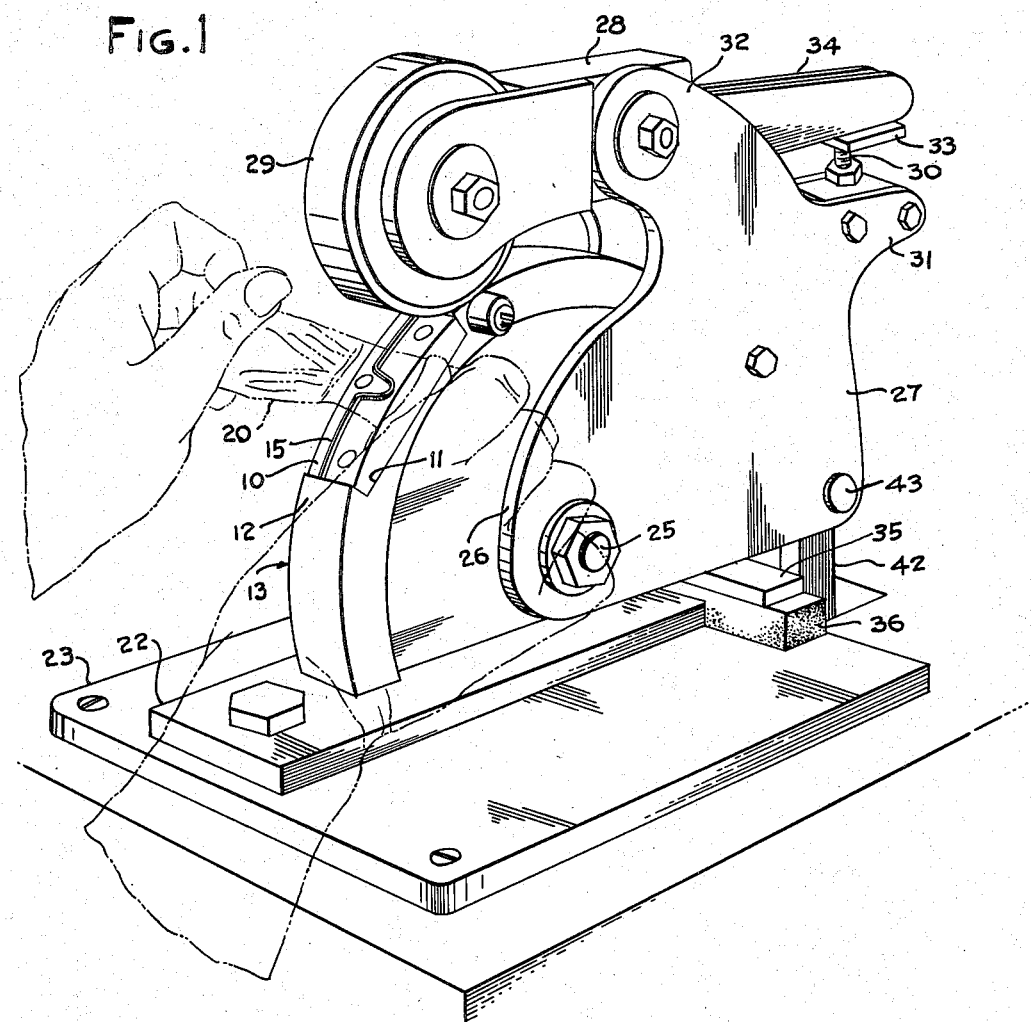
Figure 1 is a perspective view of a trimming or pinking machine embodying the features of the invention.
Figure 2:
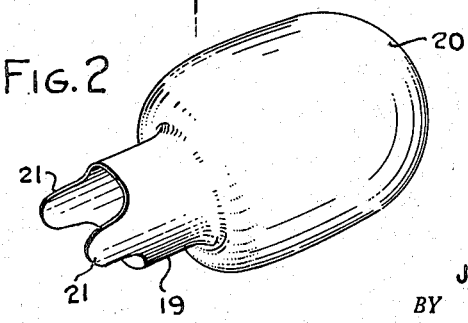
Figure 2 is a perspective view of a thin, deposited rubber sheath of the type adapted to be trimmed in the machine.
Figure 3:
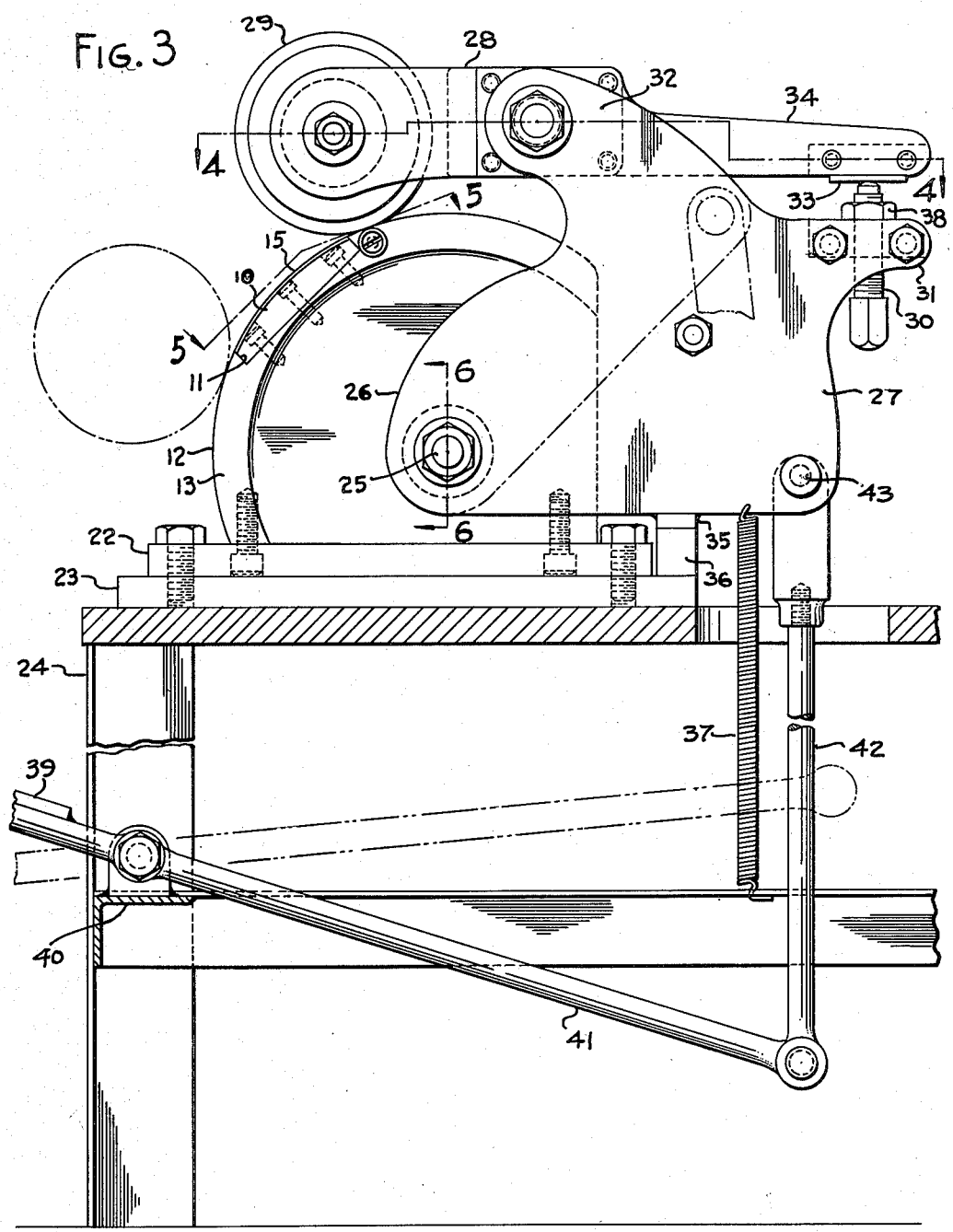
Figure 3 is a side elevation of the machine, partly broken away and in section.
Figure 4:
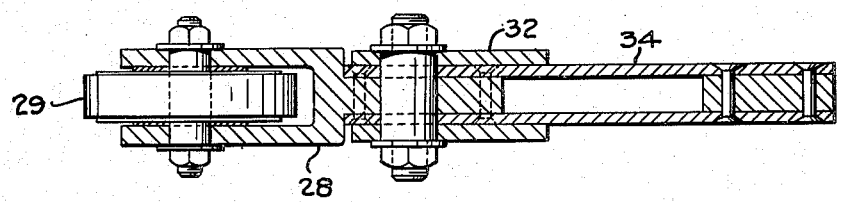
Figure 4 is a horizontal cross-section, taken substantially on the line 4—4 of Figure 3.
Figure 5:
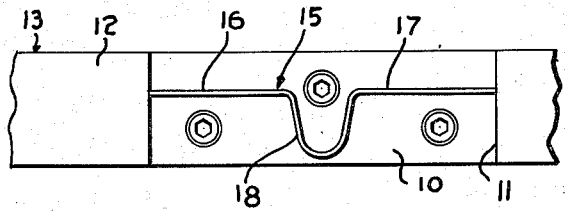
Figure 5 is a fragmentary view, taken substantially on the line 5—5 of Figure 3, and illustrating the detail of the cutting die.
Figure 6:
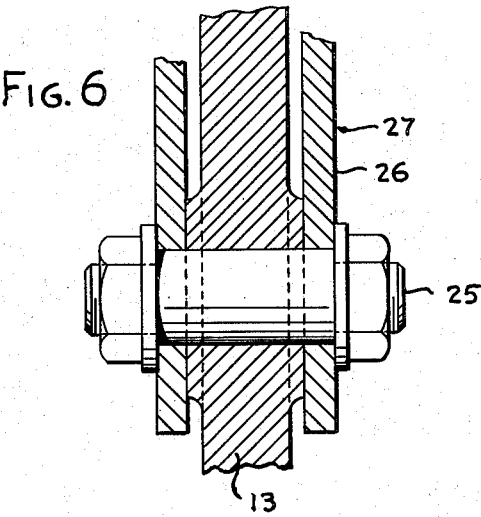
Figure 6 is an enlarged fragmentary cross-section, taken substantially on the line 6—6 of Figure 3.

Referring particularly to Figures 1 and 3, the numeral 10 designates a cutting die removably secured within a recess 11 presented upwardly and forwardly in an arcuate track surface 12 of a fixed die holder 13, the arc of said track surface being struck at a radius from a pivotal point thereon of a yoke 27 to be described later. Die 10 includes a narrow blade 15 of desired configuration, including straight portions 16 and 17 and an intermediate looped portion 18 (see Figures 1 and 5), adapted to trim the reduced neck 19 of a thin rubber sheath 20 (Figure 2) to have oppositely disposed tabs 21, 21. The cutting edge of the blade 15 lies substantially within the same radius as the track surface.

The fixed die holder 13 is relatively narrow, as shown, and the die 10 is of no greater width, so that an operator stretching a sheath between the fingers of opposite hands while holding the sheath against the die 10 may safely hold the hands relatively close to the opposite sides of the holder. A base 22 is provided on the bottom of the holder for bolting it to a bed plate 23 in turn secured to the top of a table or frame 24.

A bolt or pin 25 extended through the holder 13 and opposite portions 26 of a yoke 27 embracing the same, provides the pivotal connection for the yoke at the aforementioned pivotal point. Pivoted within an upwardly extending bifurcation 32 on the yoke 27 may be an arm 28 on a free end of which is mounted a pressure roller 29, of no greater width than the track 12, and yieldingly held in pressure engagement with the same as by means of a set screw 30 threaded through a rearward extension 31 of the yoke to have the free end of the screw in pressure engagement with a hardened steel plate 33 on the underside of a rearward extension 34 of arm 28. The arrangement is such that the yoke 27 may be pivoted forwardly from the retracted position best shown in full lines in Figure 3, to the chain-dotted position of Figure 3, the roller thereby rolling along the track surface 12 in full pressure engagement therewith and with the cutter blade 15. In said retracted position the yoke is yieldingly held in stop engagement of a plate 35 fixed on the bottom edge thereof with a rubber bumper 36 on the bed plate 23, as by means of a tension spring 37 extended between the yoke and a portion of the frame 24. Pressure applied between the roller 29 and the cutting die 10 may be adjusted by turning the screw 30, and the screw may be locked in adjusted position as by means of a nut 38 threaded on the screw and turned against the yoke extension 31.

For swinging the yoke 27 toward and from said chain-dotted position of Figure 3, a foot pedal 39, pivoted to a cross-member 40 near the bottom of the frame 24, has a rearward extension 41, to the inner end of which is pivoted a link 42 having the other end thereof pivoted at 43 to a rearward portion of the yoke.

In operation of the machine described for trimming the usual excess rubber from the reduced neck 19 of a thin, dipped rubber sheath, the same is held stretched between the hands of the operator and positioned against the die 10, as shown in chain dotted lines in Figure 1. While retaining this position of the article, and with the hands safely maintained at least several inches away from the opposite sides of the die holder, the operator presses the foot lever 39 with one foot, thereby through the link 42 to urge the yoke 27 forwardly in an arc about the pivot pin 25 and applying a rolling pressure of the roller 29 against the flattened neck of the article positioned on the die, to cut through two thicknesses of the rubber material. Removal of the excess rubber in this manner leaves a neatly and uniformly trimmed neck portion 19 on the article, including the freely extending gripping tabs 21, 21 thereon. Upon release of pressure on the foot-lever 39 the spring 37 urges the yoke and associated movable parts back to the retracted positions thereof, ready for another trimming operation.

Modifications of the invention may be resorted to without departing from the spirit thereof or the scope of the appended claims.

What is claimed is:

1. Apparatus for trimming thin articles, comprising a relatively fixed member having an arcuate surface portion defining a track, a cutting die along at least a part of said track, a holder pivoted with respect to said member, an arm pivoted on said holder, a roller on a free end of said arm, said holder thereby being swingable on its pivot to move said roller in an arcuate path along said track, means on said holder and said arm urging said roller toward pressure engagement thereof with said track, and power means for swinging said holder on its pivot and by said pressure engagement of the roller along the track to trim an article positioned over said die.

2. Apparatus for trimming thin articles, comprising a relatively fixed member having an arcuate surface portion struck from a radius point and defining a track, a cutting die along at least a part of said track, a holder pivoted on said member at said radius point, an arm pivoted on said holder and extending freely over said track, a roller mounted on the free end of said arm, pressure means for urging said arm toward pressure engagement of said roller with said track, and power means for swinging said holder along the track to trim an article positioned over said die.

3. Apparatus for trimming thin articles, comprising a relatively fixed member having an arcuate surface portion struck from a radius point and defining a track, a cutting die along at least a part of said track, a holder pivoted on said member at said radius point, an arm pivoted on said holder and extending freely over said track, a roller mounted on the free end of said arm, pressure means for urging said arm toward pressure engagement of said roller with said track, and power means for swinging said holder along the track to trim an article positioned over said die, said pressure means including an extension on said arm and a screw on said holder adjustable against said extension.

4. Apparatus for trimming thin articles, comprising a relatively fixed member having an arcuate surface portion struck from a radius point and defining a track, a cutting die along at least a part of said track, a holder pivoted on said member at said radius point, an arm pivoted on said holder and extending freely over said track, a roller mounted on the free end of said arm, pressure means for urging said arm toward pressure engagement of said roller with said track, and power means for swinging said holder along the track to trim an article positioned over said die, said power means including a foot pedal, a link extended from said foot pedal to said member, a stop engageable by said holder in an inoperative position thereof, and spring means normally yieldingly retaining said holder in said stop position.

5. Apparatus for trimming thin articles, comprising a relatively fixed member having an arcuate surface portion struck from a radius point and defining a track, a cutting die along at least a part of said track, a holder pivoted on said member at said radius point, an arm pivoted on said holder and extending freely over said track, a roller mounted on the free end of said arm, pressure means for urging said arm toward pressure engagement of said roller with said track, and power means for swinging said holder along the track to trim an article positioned over said die, said pressure means including an extension on said arm and a screw on said holder adjustable against said extension, said power means including a foot pedal, a link extended from said foot pedal to said member, a stop engageable by said holder in an inoperative position thereof, and spring means normally yieldingly retaining said holder in said stop position.

6. Apparatus for trimming thin articles, comprising a relatively fixed member having an elongated surface portion defining a track, a cutting die along at least a part of said track, a holder shiftable with respect to said member, an arm shiftable on said holder, a roller on said arm, said holder thereby being shiftable to move said roller in a path parallel to said track, means on said holder and said arm urging said roller toward pressure engagement thereof with said track, and power means for shifting said holder and by said pressure engagement of the roller along the track to trim an article positioned over said die, said pressure means including an extension on said arm and a screw on said holder adjustable against said extension.

7. Apparatus for trimming thin articles, comprising a relatively fixed member having an elongated surface portion defining a track, a cutting die along at least a part of said track, a holder shiftable with respect to said member, an arm shiftable on said holder, a roller on said arm, said holder thereby being shiftable to move said roller in a path parallel to said track, means on said holder and said arm urging said roller toward pressure engagement thereof with said track, and power means for shifting said holder and by said pressure engagement of the roller along the track to trim an article positioned over said die, said power means including a foot pedal, a link extended from said foot pedal to said member, a stop engageable by said holder in an inoperative position thereof, and spring means normally yieldingly retaining said holder in said stop position.

8. Apparatus for trimming thin articles, comprising a relatively fixed member having an elongated surface portion defining a track, a cutting die along at least a part of said track, a holder shiftable with respect to said member, an arm shiftable on said holder, a roller on said arm, said holder thereby being shiftable to move said roller in a path parallel to said track, means on said holder and said arm urging said roller toward pressure engagement thereof with said track, and power means for shifting said holder and by said pressure engagement of the roller along the track to trim an article positioned over said die, said pressure means including an extension on said arm and a screw on said holder adjustable against said extension, said power means including a foot pedal, a link extended from said foot pedal to said member, a stop engageable by said holder in an inoperative position thereof, and spring means normally yieldingly retaining said holder in said stop position.

JOHN R. GAMMETER.

REFERENCES CITED

The following references are of record in the file of this patent:

UNITED STATES PATENTS

| Number | Name | Date |
|---|---|---|
| 1,041,341 | Peterson | Oct. 15, 1912 |
| 1,196,986 | Roney | Sept. 5, 1916 |
| 1,616,752 | MacDonald | Feb. 8, 1927 |
| 2,121,003 | Balfe | June 21, 1938 |
| 2,127,820 | Kindelberger | Aug. 23, 1938 |

FOREIGN PATENTS

| Number | Country | Date |
|---|---|---|
| 96,446 | Germany | Mar. 14, 1898 |
| 35,620 | Switzerland | June 1, 1945 |